J. SCOGGIN.
Guano and Seed Distributer.
No. 213,843. Patented April 1, 1879.
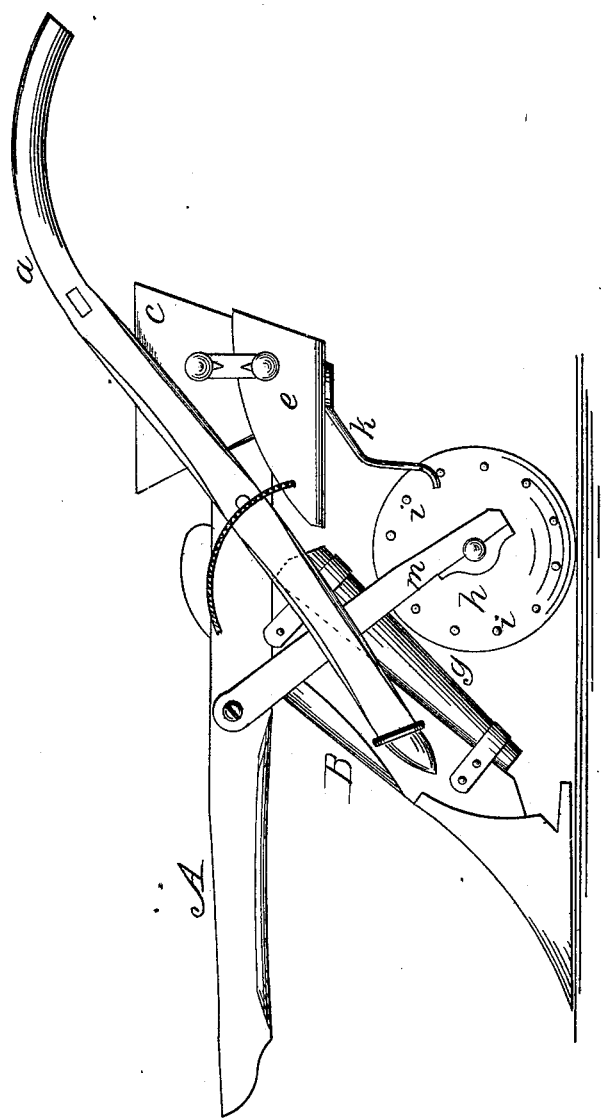

UNITED STATES PATENT OFFICE.

JOSEPH SCOGGIN, OF RUTHERFORDTON, NORTH CAROLINA.

IMPROVEMENT IN GUANO AND SEED DISTRIBUTERS.

Specification forming part of Letters Patent No. 213,843, dated April 1, 1879; application filed January 24, 1879.

*To all whom it may concern:*

Be it known that I, JOSEPH SCOGGIN, of Rutherfordton, North Carolina, have invented an Improvement in Guano and Seed Distributers, of which the following is a specification:

My invention relates to planters for dropping seed or fertilizers of that class in which the seed or other material is deposited automatically in a furrow formed by the share in advance of the dropping mechanism.

It consists of an improved construction of the apparatus, the object being to secure cheapness with durability and efficiency in use.

The drawing shows a side view of the apparatus.

It is adapted to be drawn by a single horse, and to be held and guided by the attendant walking in the rear.

A represents the beam, and $a\ a$ the handles, which are all of the ordinary form used in common plows or single cultivators.

To the beam is fixed the ordinary post (marked B) which carries the share or furrow-opener, and to this the lower ends of the handles are secured.

In rear of the beam, and between the handles, is a box, $c$, of sufficient capacity to contain the material to be dropped in the furrow. This box is made with inclined sides, converging to an opening at the bottom; and it may be open at the top, or may be provided with a cover, as may be desired. Suspended from this box by straps, one on each side, is a spout or shoe, $e$. This is hung directly underneath the opening in the bottom of the box, so as to receive the material as it falls. This spout or shoe must be of a capacity and shape suited to receive all the grain or other material which may fall from the box, and hold it without spilling over the sides.

When in proper position, the front end of the shoe projects over the upper and open end of a spout, $g$, which is fixed to the rear of the post B. This spout extends down the post to a point directly in rear of the share which opens the furrow. The arrangement of these spouts is such that the seed or other material may flow from the box, fall into the spout $e$, and advance to the forward end of it, so that when this end of the spout is slightly depressed the grain or fertilizer will drop into the spout $g$ and descend to the furrow.

In order to give the shoe $e$ an intermittent vertical motion, to cause its contents to pass into the spout $g$, I have provided a wheel, $h$, in which are pins $i\ i$, that strike arms $k$ on the bottom of the suspended spout $e$. This wheel is hung in suitable bearings in the ends of arms $m\ m$, one on each side, which are pivoted on the beam.

The arms $k$ are firmly attached to the under side of the shoe $e$, are brought forward, as shown in the drawing, and made to bestride the wheel and rest on the pins $i\ i$.

The arrangement of the parts is such that when they are in place, and the instrument applied to its work, the wheel, resting on the ground directly behind the spout $g$ on the post, and revolving with the motion of the instrument, shall alternately lift and drop a slight distance the arms $i\ i$, and thereby the shoe $e$. This motion slightly shakes the shoe and its contents, and causes the latter to discharge in small quantities at brief and regular intervals into the furrows.

The instrument is adapted to drop seed or guano, or any other pulverized fertilizer.

I am aware that seed-planters of this general form are not new; that it is not new to attach the spout in rear of the post of the share; and I am also aware that a wheel to agitate the hopper or shoe which carries the grain is also old.

I therefore limit myself to the precise construction made by me, which has the merit of cheapness and simplicity. It can be made and repaired by any ordinary workman with ordinary appliances.

I claim—

The combination of the box $c$, arranged between the handles and in rear of the beam, and of the spout or shoe $e$, hung thereto by flexible straps and pivoted with arms $k\ k$, adapted to be operated by pins $i\ i$ on the wheel $h$, said wheel being mounted in rear ends of pivoted arms $m\ m$, the whole being arranged in relation to the spout $e$ and other parts of the apparatus, as set forth.

In testimony whereof I have signed my name to this specification in the presence of two subscribing witnesses.

JOSEPH SCOGGIN.

Witnesses:
 R. W. LOGAN,
 C. A. CARSON.